(12) United States Patent
Yamanaka et al.

(10) Patent No.: US 7,690,448 B2
(45) Date of Patent: Apr. 6, 2010

(54) CAR

(75) Inventors: Shunji Yamanaka, Tokyo (JP);
Takayuki Furuta, Chiba (JP);
Masaharu Shimizu, Tokyo (JP);
Hideaki Yamato, Chiba (JP); Yu Okumura, Tokyo (JP); Tetsuo Tawara, Tokyo (JP); Masaki Shimomura, Tokyo (JP); Ken Endo, Shizuoka (JP)

(73) Assignees: Chiba Institute of Technology, Chiba (JP); Leading Edge Design Corp., Tokyo (JP)

( * ) Notice: Subject to any disclaimer, the term of this patent is extended or adjusted under 35 U.S.C. 154(b) by 870 days.

(21) Appl. No.: 11/454,051

(22) Filed: Jun. 14, 2006

(65) Prior Publication Data

US 2007/0035109 A1    Feb. 15, 2007

(51) Int. Cl.
*B62D 61/10* (2006.01)
(52) U.S. Cl. .................................. 180/23
(58) Field of Classification Search ............. 180/23, 180/24.03, 24.06, 24.07, 24.08, 211–214
See application file for complete search history.

(56) References Cited

U.S. PATENT DOCUMENTS

| | | | | |
|---|---|---|---|---|
| 3,110,352 A | * | 11/1963 | McClarnon | 180/211 |
| 4,237,990 A | * | 12/1980 | La | 180/7.1 |
| 4,657,104 A | * | 4/1987 | Holland | 180/211 |
| 4,715,460 A | * | 12/1987 | Smith | 180/7.1 |
| 5,213,176 A | * | 5/1993 | Oroku et al. | 180/168 |
| 6,112,843 A | * | 9/2000 | Wilcox et al. | 180/345 |
| 6,206,126 B1 | * | 3/2001 | Thiermann et al. | 180/209 |
| 6,212,731 B1 | * | 4/2001 | Eckerlein et al. | 15/320 |
| 6,293,579 B1 | * | 9/2001 | Schaeff | 280/638 |

* cited by examiner

*Primary Examiner*—Faye M. Fleming
(74) *Attorney, Agent, or Firm*—Nutter McClennen & Fish LLP; John J. Penny, V

(57) ABSTRACT

A car includes a car body having a bottom portion, a wheel that is rotatable, and a supporting member for supporting the wheel, the supporting member being provided to the bottom portion. At least eight pairs of the wheel and the supporting member are provided. The supporting member has a first supporting portion for supporting the wheel rotatably, a second supporting portion for supporting the first supporting portion so that a direction of the wheel supported by the first supporting portion can be changed, and a turning portion that is rotatable about a rotation axis with its axial direction along a direction orthogonal to the bottom portion, the turning portion being provided to the bottom portion. The turning portion supports the second supporting portion so that a distance between the wheel and the bottom portion can be changed, and a position of the wheel can be moved by a rotation of the turning portion in a state that the distance is maintained.

16 Claims, 12 Drawing Sheets

TOP VIEW

STATE A1

STATE A2

STATE A3

STATE A4

STATE A5

STATE A6

STATE A7

STATE A8

STATE B1

STATE B2

STATE B3

STATE B4

STATE B5

STATE B6

STATE B7

STATE C1

STATE C2

STATE C3

STATE C4

STATE C5

STATE C6

STATE C7

STATE C8

STATE C9

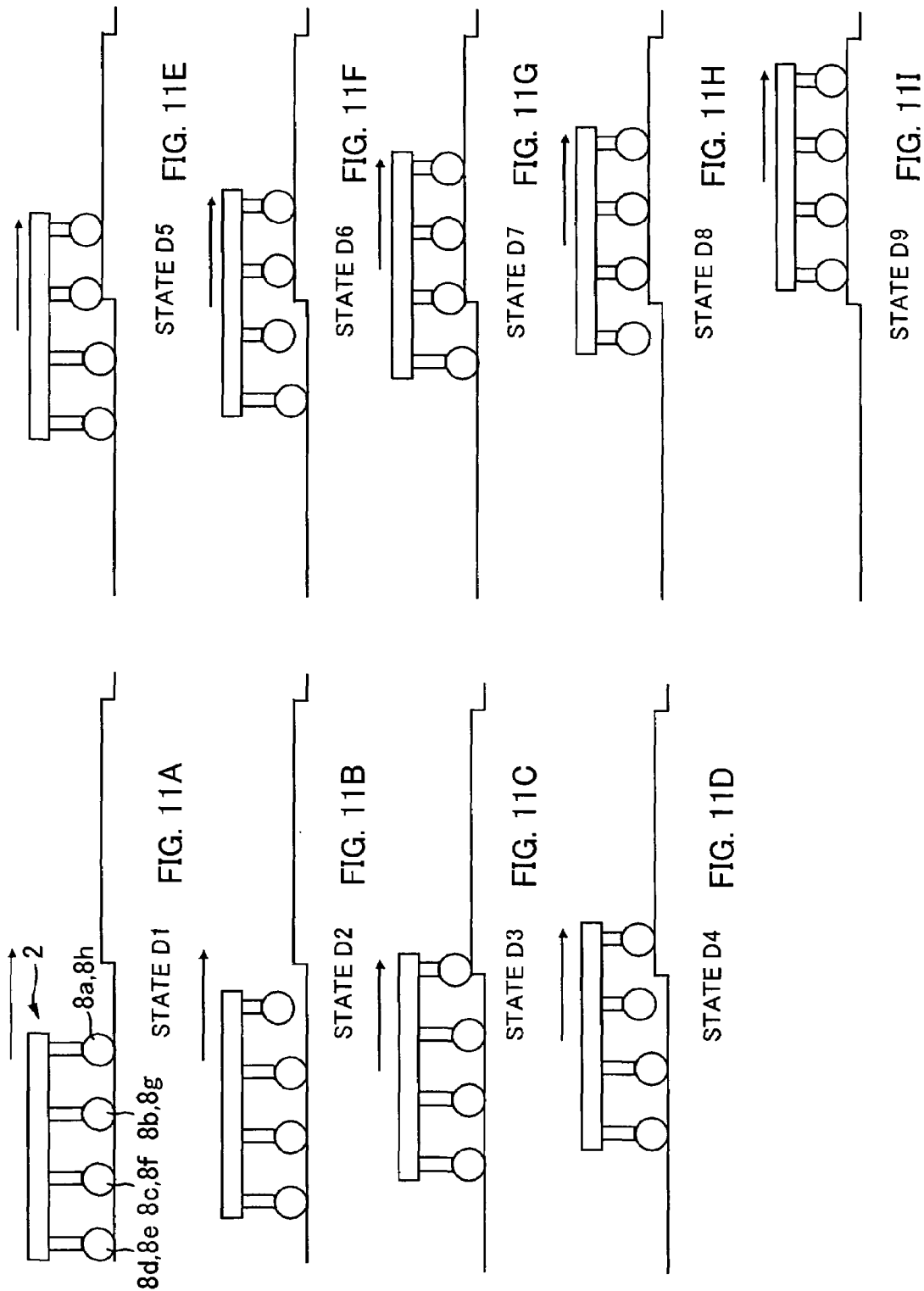

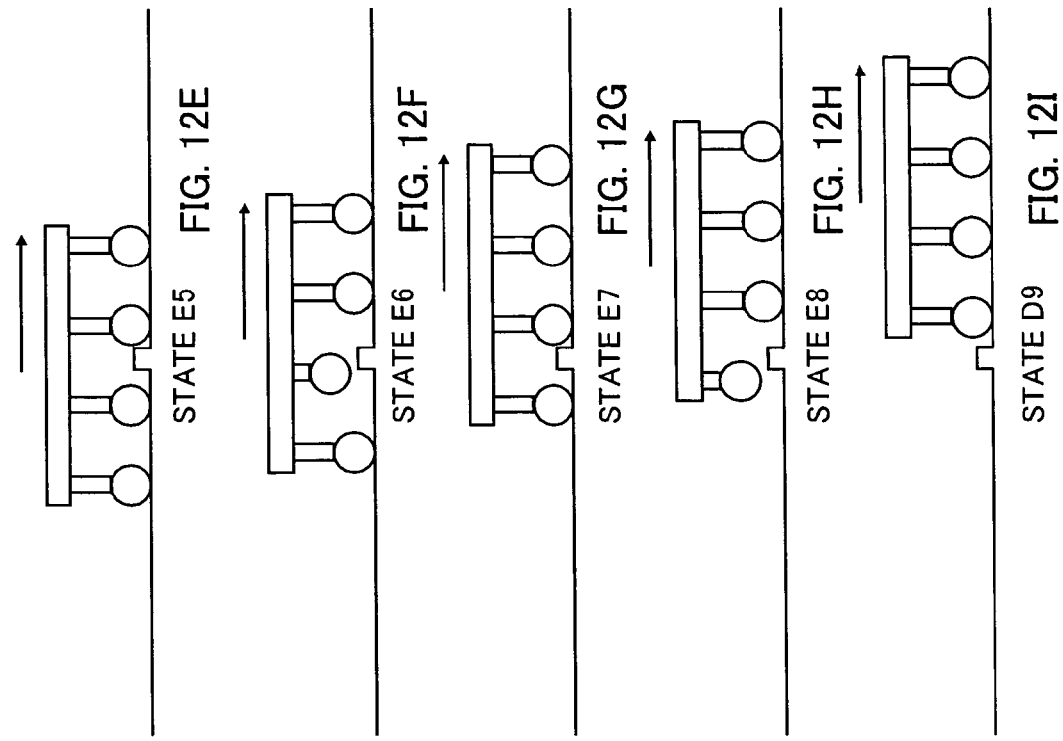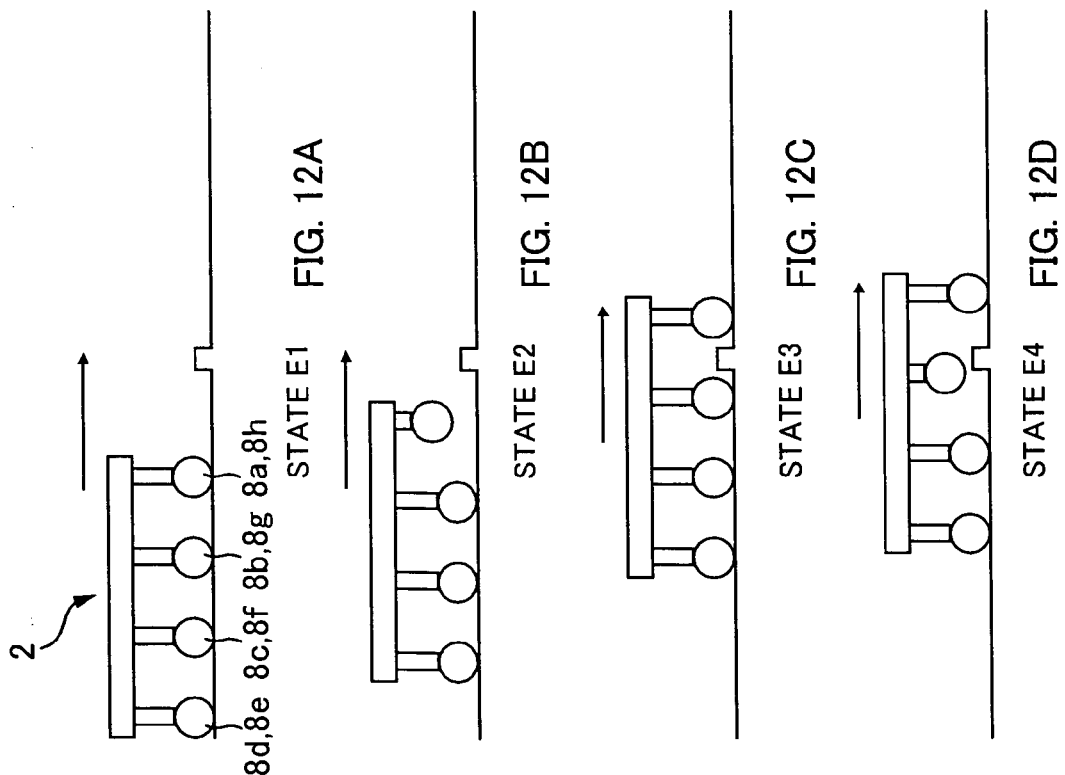

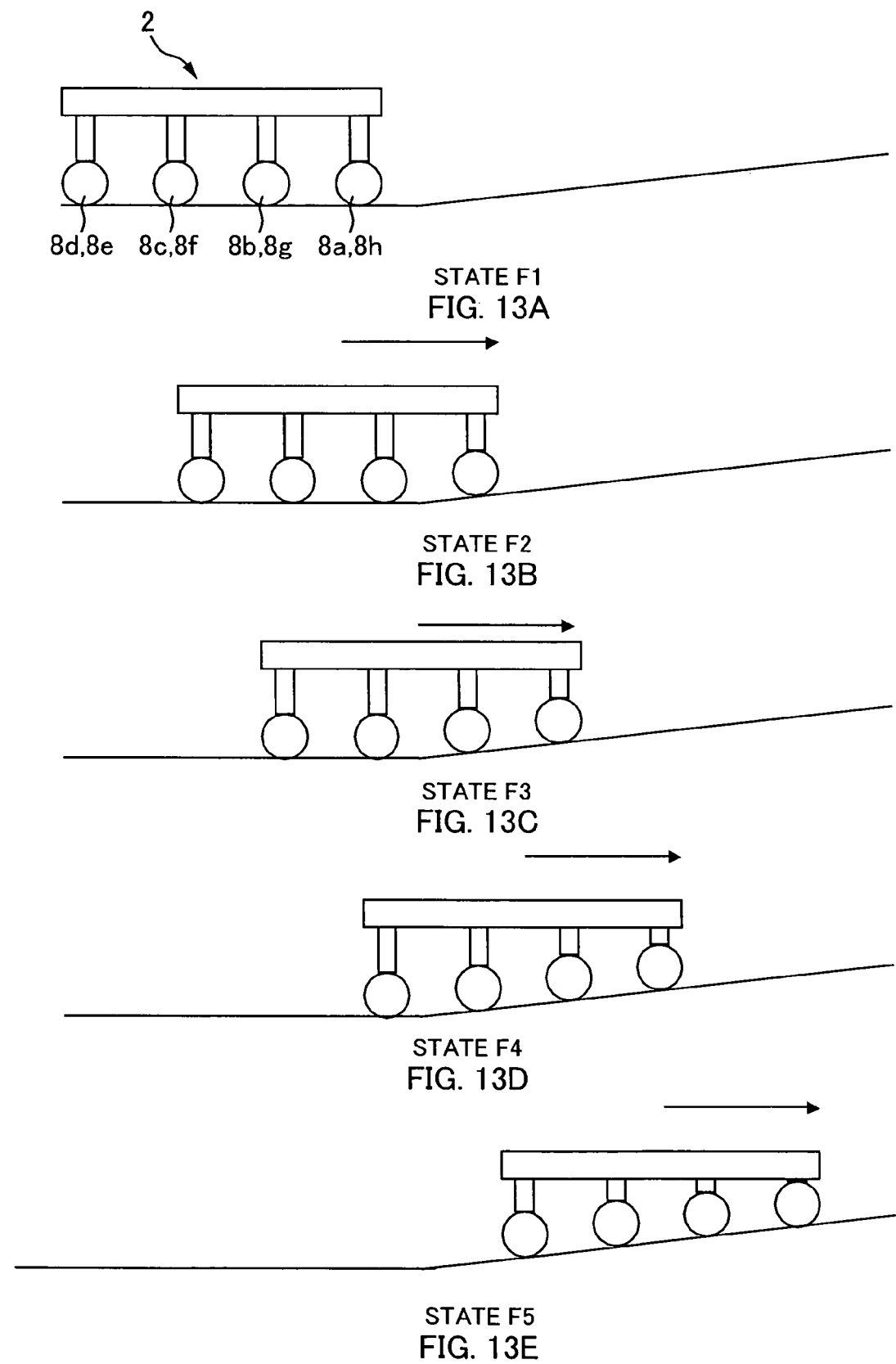

CAR

CROSS-REFERENCE TO RELATED APPLICATIONS

Japanese Patent Application No. 2003-392081 filed on Nov. 21, 2003 is incorporated by reference.

BACKGROUND

1. Technical Field

The present invention relates to cars.

2. Related Art

Cars are well-known. The car includes a car body having a bottom portion, a rotatable wheel, and a supporting member for supporting the wheel provided at the bottom portion, and the car runs in a predetermined traveling direction by the rotation of the wheel (refer to JP-A-2002-227883).

By the way, a typical well-known car has four wheels, and some or all of the four wheels are driven, so that the car runs in a predetermined traveling direction. Although, the car can turn by changing the direction of the wheels or back up by rotating the wheels in a reverse direction, the variety of movements is such that it is limited.

SUMMARY

An advantage of some aspects of the present invention is that it is possible to realize a car that can perform various movements.

An aspect of the invention is a car including: a car body having a bottom portion; a wheel that is rotatable; and a supporting member for supporting the wheel, the supporting member being provided to the bottom portion, wherein at least eight pairs of the wheel and the supporting member are provided, wherein the supporting member has a first supporting portion for supporting the wheel rotatably, a second supporting portion for supporting the first supporting portion so that a direction of the wheel supported by the first supporting portion can be changed, and a turning portion that is rotatable about a rotation axis with its axial direction along a direction orthogonal to the bottom portion, the turning portion being provided to the bottom portion, and wherein the turning portion supports the second supporting portion so that a distance between the wheel and the bottom portion can be changed, and a position of the wheel can be moved by a rotation of the turning portion in a state the distance is maintained.

Other features of the present invention will be made clear through the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIGS. 11A to 11I are state transition diagrams showing a manner in which the passenger car 2 climbs up a step in the forward run;

FIGS. 12A to 12I are state transition diagrams showing a manner in which the passenger car 2 runs forward by avoiding contact with a curb; and FIGS. 13A to 13E are state transition diagrams showing a manner in which the passenger car 2 goes up an inclination.

DESCRIPTION OF EXEMPLARY EMBODIMENTS

Figure 1:
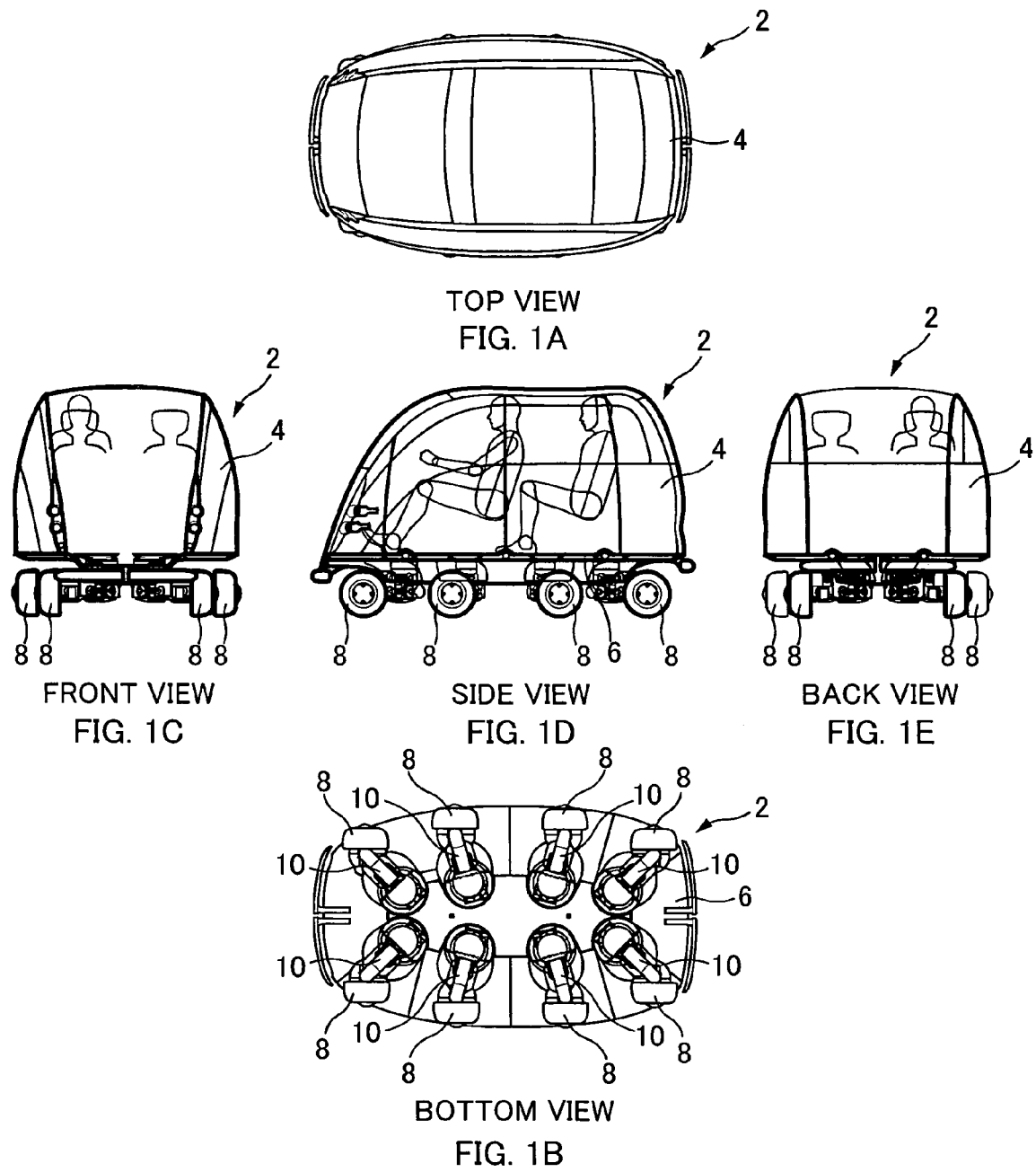
FIG. 1A is a top view showing an example of a configuration of a passenger car 2.
FIG. 1B is a bottom view showing an example of the configuration of the passenger car 2.
FIG. 1C is a front view showing an example of the configuration of the passenger car 2.
FIG. 1D is a side view showing an example of the configuration of the passenger car 2.
FIG. 1E is a back view showing an example of the configuration of the passenger car 2.

At least the following matters will become clear through the description of the present specification and the accompanying drawings.

A car including:

a car body having a bottom portion;

a wheel that is rotatable; and a supporting member for supporting the wheel, the supporting member being provided to the bottom portion, wherein at least eight pairs of the wheel and the supporting member are provided, wherein the supporting member has a first supporting portion for supporting the wheel rotatably, a second supporting portion for supporting the first supporting portion so that a direction of the wheel supported by the first supporting portion can be changed, and a turning portion that is rotatable about a rotation axis with its axial direction along a direction orthogonal to the bottom portion, the turning portion being provided to the bottom portion, and wherein the turning portion supports the second supporting portion so that a distance between the wheel and the bottom portion can be changed, and a position of the wheel can be moved by a rotation of the turning portion in a state that the distance is maintained.

Thus, it is possible to achieve a car that can perform a variety of movements.

Further, it is possible that the turning portion supports the second supporting portion via a parallel link mechanism.

Thus, supporting the second supporting portion by the turning portion can be realized with a simple structure.

Further, it is possible that there is included:

a first driving section for rotating the wheel;

a second driving section for changing a direction of the wheel;

a third driving section for changing a distance between the wheel and the bottom portion; and a fourth driving section for rotating the turning portion, wherein the first driving section, the second driving section, the third driving section, and the fourth driving section are provided for every wheel.

In this case, one wheel, a corresponding supporting member, and a corresponding driving means can be made into one module. Therefore, by attaching the module to the car body or by detaching it from the car body, a number of the wheels can be easily increased or decreased.

Further, it is possible that the first driving section, the second driving section, the third driving section, and the fourth driving section are provided in the supporting member, and wherein the supporting member and the wheel are positioned lower than a front surface of the bottom portion.

In this case, the front surface of the bottom portion can be easily made even (flat). Further, in the case where the front surface of the bottom portion is flat, it is possible to flexibly design an internal structure of the car body.

Further, it is possible that there is included a controlling section for controlling the first driving section, the second driving section, the third driving section, and the fourth driving section, wherein the controlling section is provided for every wheel.

In this case, one wheel, a corresponding supporting member, a corresponding driving section described above, and a corresponding controlling section can be made into one module. Therefore, by attaching the module to the car body, or detaching it from the car body, the number of the wheels can be increased or decreased more easily.

Further, it is possible that the controlling section is positioned lower than the front surface of the bottom portion.

In this case, the front surface of the bottom portion can be made even (flat) more easily. Then, in the case where the front surface of the bottom portion is even, it is possible to flexibly design the internal structure of the car body.

Further, it is possible that a convex portion for containing the controlling section is provided on a back surface of the bottom portion.

In this case, even in the case where the size of the controlling section is large, the front surface of the bottom portion can be easily made-even (flat).

Further, it is possible that a recess portion is provided in the back surface of the bottom portion, the recess portion being for preventing the wheel and the supporting portion from contacting the bottom portion at the time a distance between the wheel and the bottom portion is changed and the wheel comes close to the bottom portion.

In this case, it is possible to operate the car in a state that the front surface of the bottom portion and the wheel are close. Further, in the case where there is a projection such as a step or a curb in the ground, even if the height of the projection is high, it is possible to realize a desired movement (for example, a movement of climbing up a step or a movement of going over a curb).

Further, it is possible to include a main controlling section that can communicate with each controlling section.

Further, it is possible that some of the wheels of the at least eight wheels provided to the car, that are in a state not contacting a ground, move.

In this case, it is possible to perform preparation for the next movement by moving the wheels not contacting the ground while moving using the wheels contacting the ground.

Further, it is possible that the car moves in a state that the bottom portion is maintained horizontal even in the case where there are projections and depressions in the ground, by selectively contacting to the ground the at least eight wheels provided to the car.

Further, it is possible that there is included a detecting section for detecting the projections and the depressions, wherein the at least eight wheels are selectively made to contact the ground, according to an output of the detecting section.

In this case, even if information regarding the position or height of the projections and depressions is not provided in advance, a desired movement (for example, a movement of climbing up a step or a movement of going over a curb) can be performed.

Further, it is possible that the car moves in a state that the bottom portion is maintained horizontal even in the case where there is an inclination in the ground, by changing the distance between the wheel and the bottom portion according to the inclination of the ground.

Further, it is possible that there is included a detecting section for detecting the inclination, wherein the distance between the wheel and the bottom portion is changed according to an output of the detecting section.

In this case, even if information regarding the position or the height of the inclination is not provided in advance, it is possible to perform a movement of moving in a state that the bottom portion is maintained horizontal.

Further, it is possible that the car moves by making some of the wheels of the at least eight wheels provided to the car contact the ground, and making the bottom portion move relatively in respect to the ground, by driving the second driving section and the fourth driving section, that correspond to the wheel, in a state that a rotation of the wheel contacting the ground is stopped.

Further, it is possible that the car is a passenger car that a person can ride in.

In this case, a passenger car that is convenient to use can be realized.

Further, it is possible that the car is a toy car.

In this case, a toy car that is attractive to a buyer can be realized.

Further, it is possible that the car is a truck for conveying goods.

In this case, a truck that can perform carrying in various ways can be realized.

An Example of a Configuration of a Passenger Car 2

Figure 2:
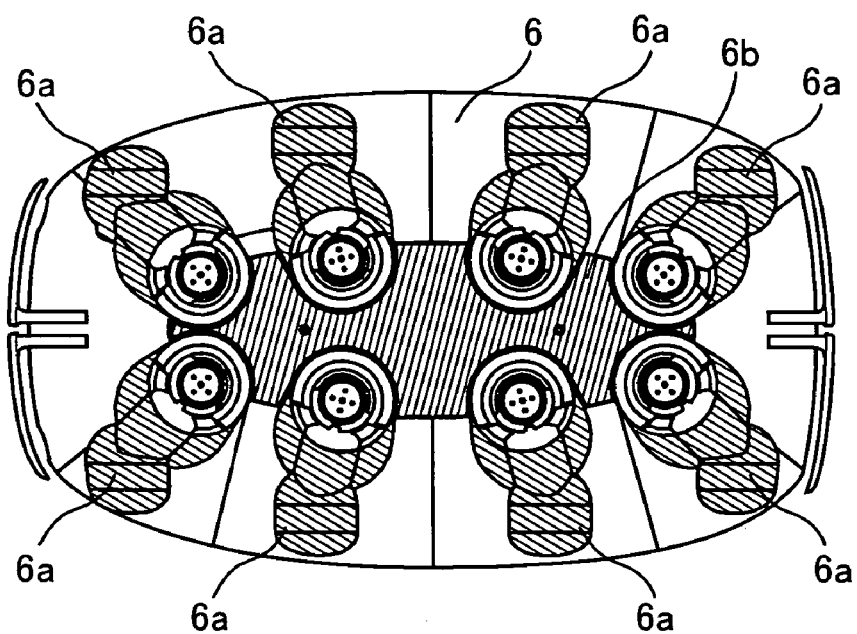
FIG. 2 is a diagram showing a back surface of a bottom portion 6 provided to the passenger car 2.
Figure 5:
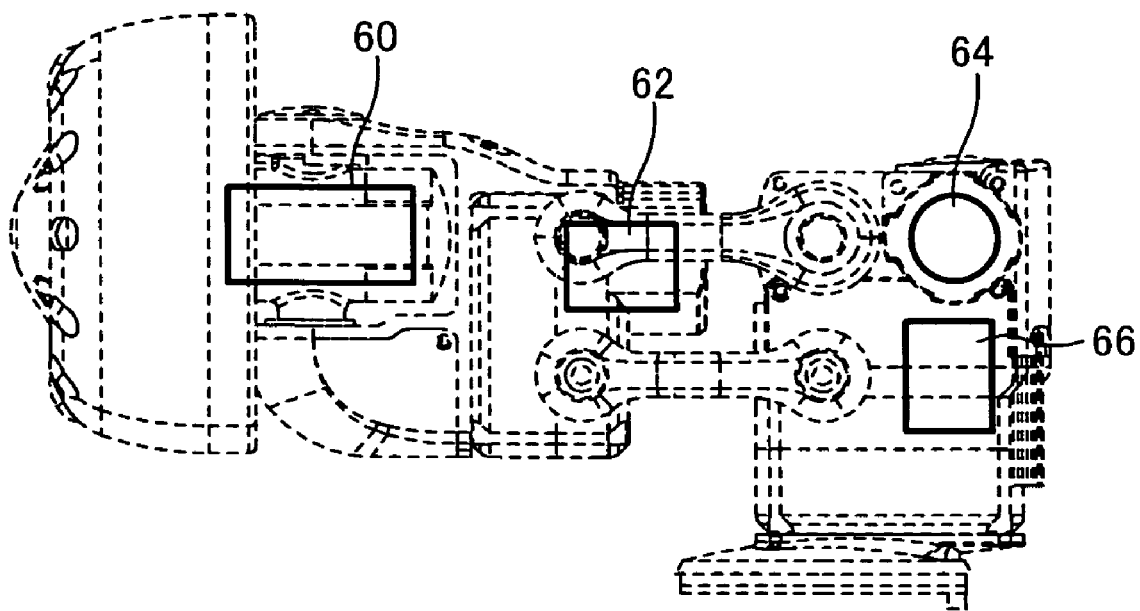
FIG. 5 is a schematic view showing a position of a motor provided in the supporting member 10.
Figure 6C:
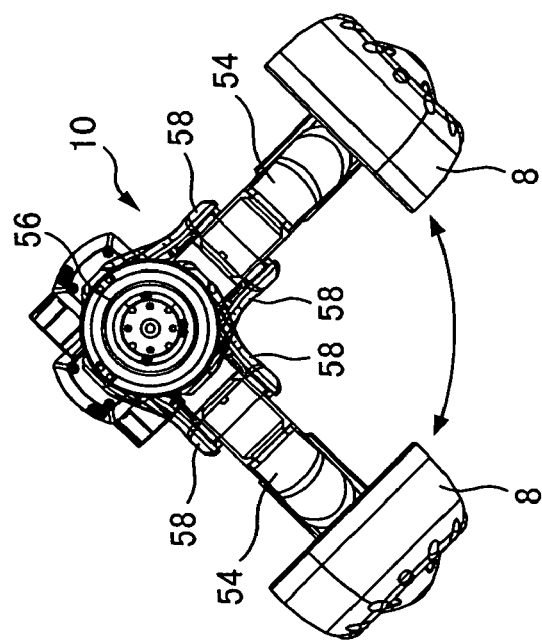
FIG. 6 is an explanatory view for explaining a movement of the wheel 8 and the supporting member 10.
Figure 6B:
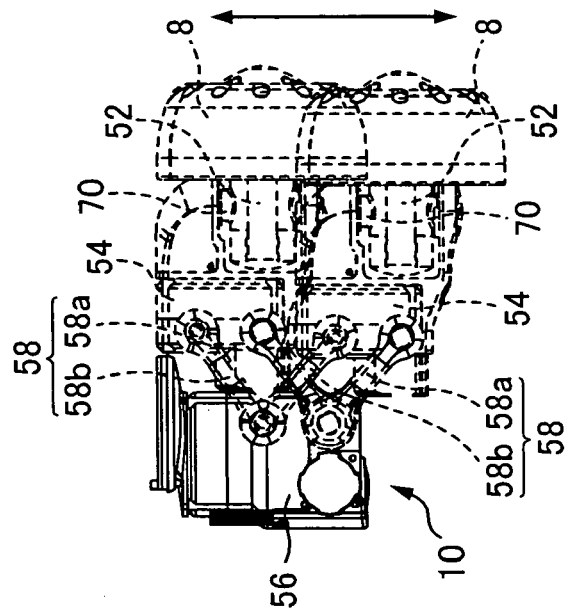
Figure 6A:
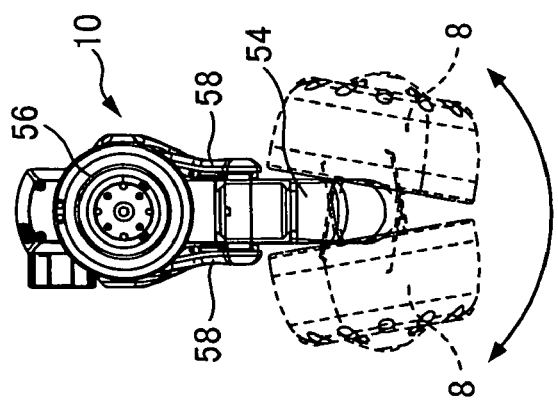
Figure 7:
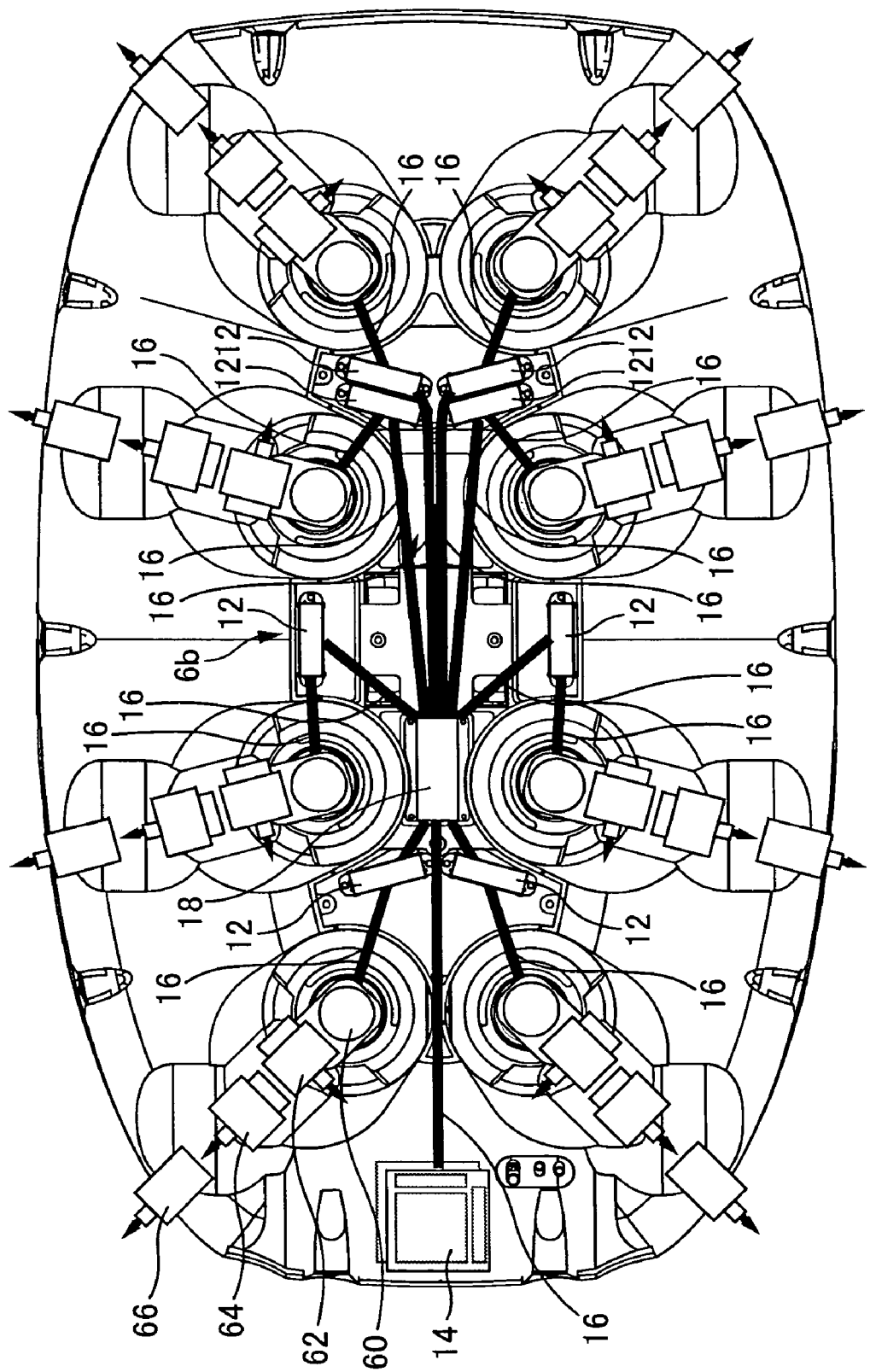
FIG. 7 is an explanatory view for explaining the position of eight sub-computers 12 and a main computer 14.
Figure 8A:
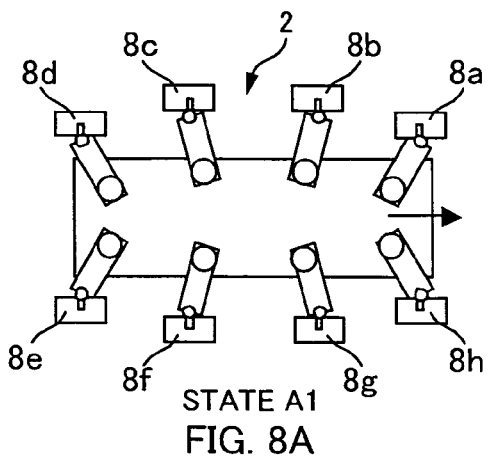
FIGS. 8A to 8H are state transition diagrams showing a manner in which the passenger car 2 performs a forward run and a rotational movement continuously.
Figure 8B:
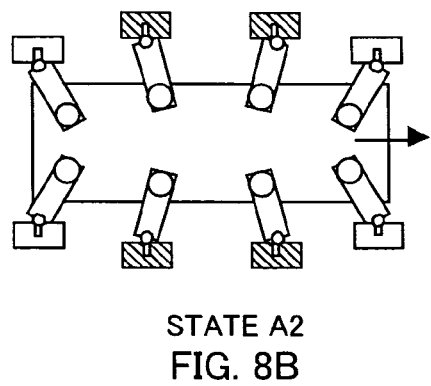
Figure 8C:
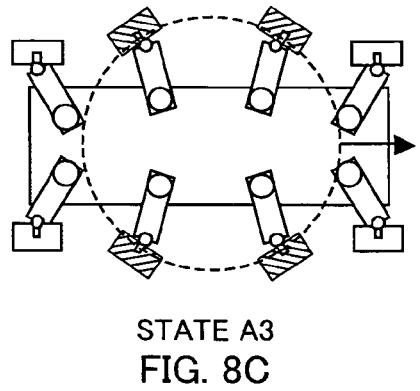
Figure 8D:
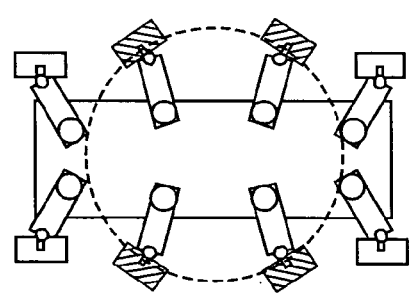
Figure 8E:
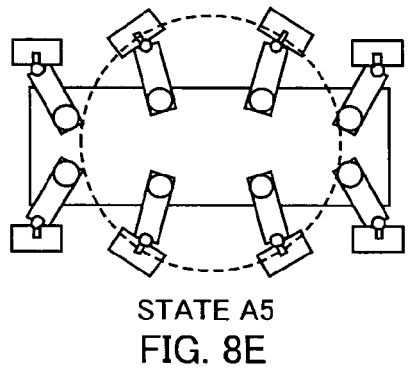
Figure 8F:
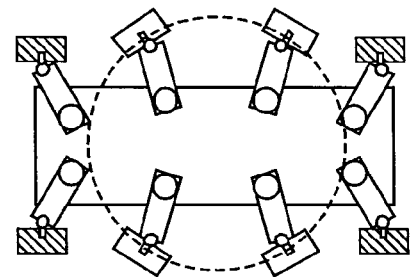
Figure 8G:
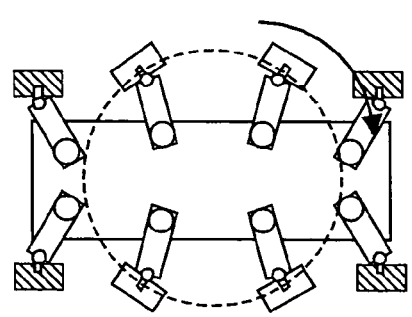
Figure 8H:
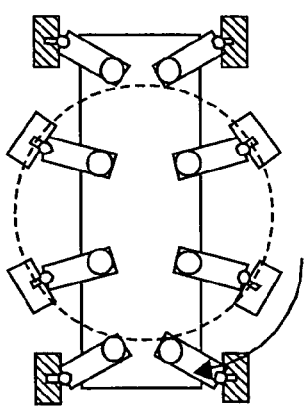

First, by using FIGS. 1A to 7, an outline of an example of a configuration of a car according to the present embodiment is explained. Note that, in this embodiment, as an example of a car, a passenger car 2 that a person can ride in is described. FIGS. 1A to 1E are six views showing an example of a configuration of the passenger car 2. FIG. 2 is a diagram corresponding to a bottom view of FIG. 1B, that is, a view showing a back surface of a bottom portion 6 provided to the passenger car 2, and in order to more easily understand the positions of recess portions 6a described later, for the sake of convenience, the wheels 8 and the supporting members 10 are omitted here. FIG. 7 is an explanatory diagram for explaining positions of eight sub-computers 12 and a main computer 14. FIGS. 3 to 6C are described later. Note that, in FIGS. 1A to 1E, for example, the car body 4 is arranged above the wheels 8.

The passenger car 2 has the car body 4, eight wheels 8, and eight of the supporting member 10 for supporting the wheel 8, that is provided for every wheel 8.

The car body 4 is a body of the passenger car 2, and similar to a well-known passenger car, has a roof portion, a door portion, a front glass portion or the like. The car body 4 is provided with a space in which a person can ride in, and the person riding the passenger car 2 can operate the passenger car 2 in order to make the passenger car 2 perform a variety of movements that will be described later.

The car body 4 is further provided with the bottom portion 6. A surface (front surface) of a front side of the bottom portion 6 has a function of a floor portion of the passenger car 2, and on the surface of the front side there are provided seats for a person riding the car to sit on. Further, on a surface (back surface) of a back side of the bottom portion 6, there are provided supporting members 10 for supporting the wheels 8. Note that, the front surface of the bottom portion 6 is a flat structure over the entire surface, but on the other hand, the back surface has recess portions 6a (in FIG. 2, shaded portions with slanted lines slanted towards the right bottom direction) and a convex portion 6b (in FIG. 2, a shaded portion with slanted lines that are slanted towards the left bottom direction), as shown in FIG. 2. The functions of the recess portion 6a and the convex portion 6b will be described in detail later.

Figure 3:
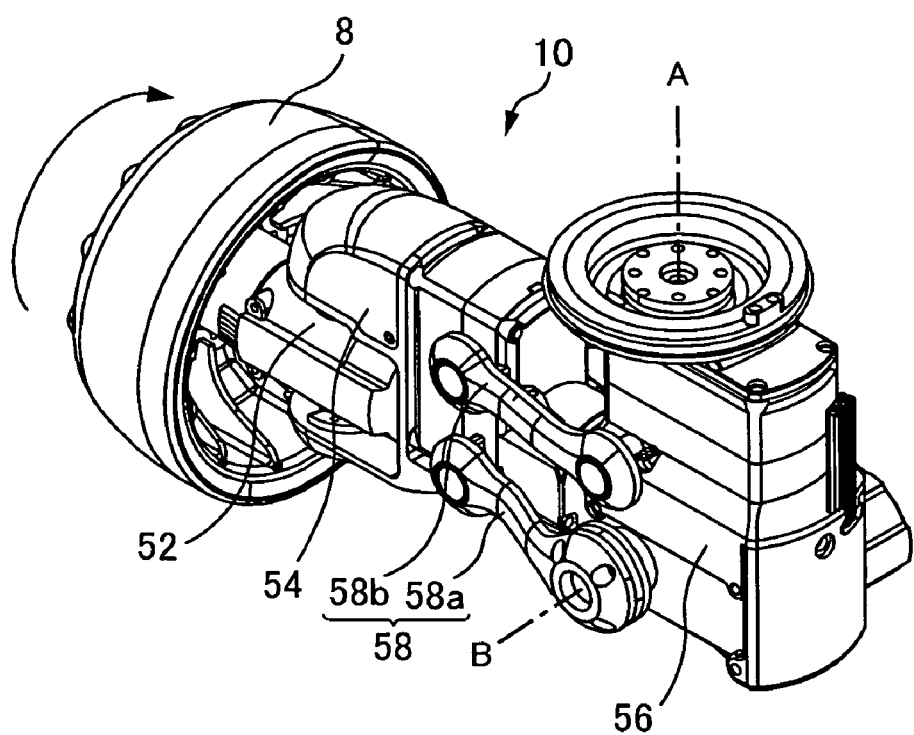
FIG. 3 is a perspective view showing a wheel 8 and a supporting member 10.
Figure 4:
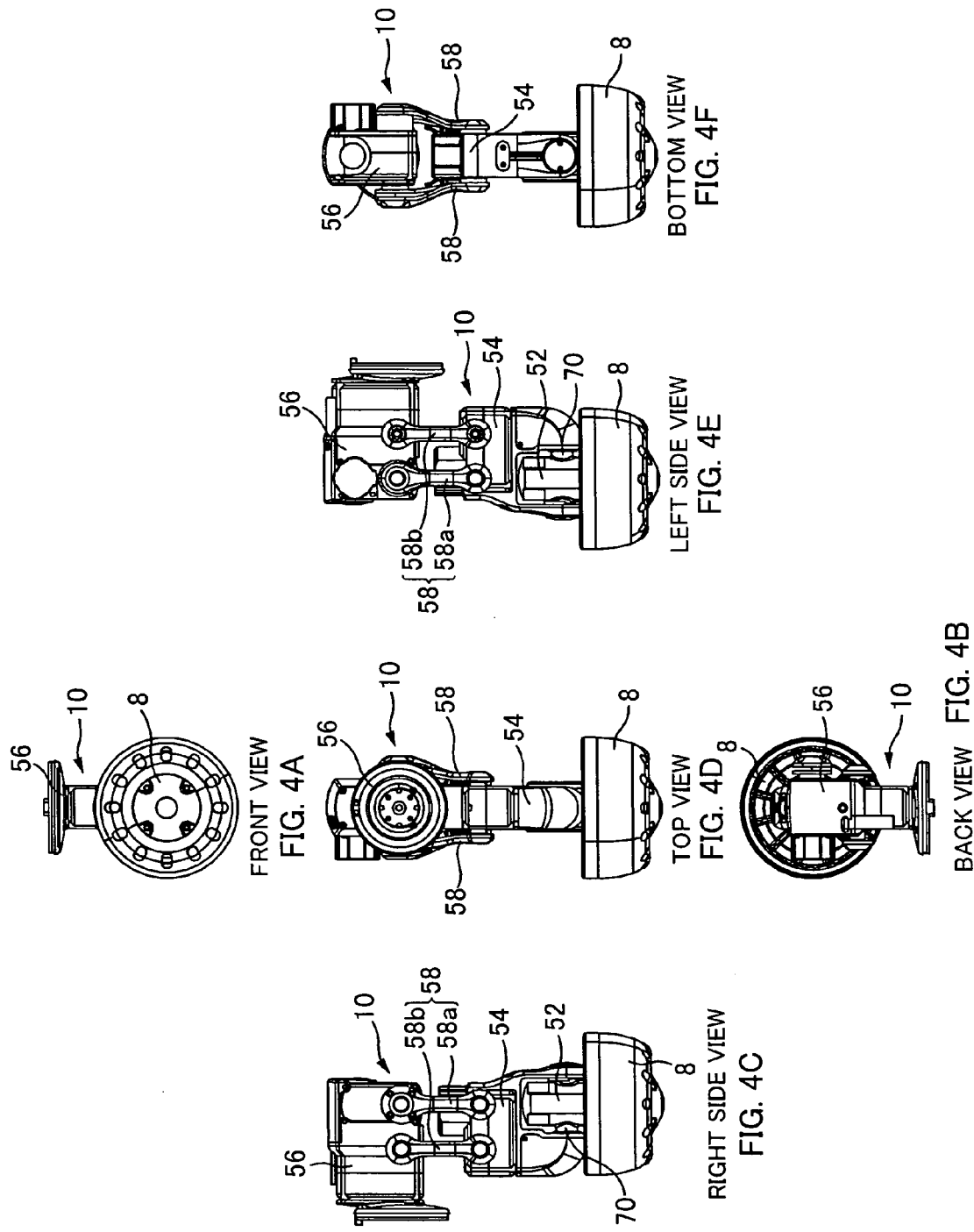
FIG. 4A is a front view showing the wheel 8 and the supporting member 10.
FIG. 4B is a rear view showing the wheel 8 and the supporting member 10.
FIG. 4C is a right side view showing the wheel 8 and the supporting member 10.
FIG. 4D is a top view showing the wheel 8 and the supporting member 10.
FIG. 4E is a left side view showing the wheel 8 and the supporting member 10.
FIG. 4F is a bottom view showing the wheel 8 and the supporting member 10.

The eight wheels 8 and the eight supporting members 10 are positioned lower than the front surface of the bottom portion 6. More specifically, the eight wheels 8 are provided on the back surface of the bottom portion 6 via the supporting member 10 provided for every wheel 8. Here, the configuration of the wheel 8 and the supporting member 10 is described using FIGS. 3 to 6C. FIG. 3 is a perspective view showing the wheel 8 and the supporting member 10. FIGS. 4A to 4F are six views showing the wheel 8 and the supporting member 10. FIG. 5 is a view corresponding to the left side view of FIG. 4E, and is a schematic view showing a position of a motor provided in the supporting member 10. FIGS. 6A to 6C are explanatory views for explaining movements of the wheel 8 and the supporting portion 10. Note that, as described above, the passenger car 2 includes eight pairs of the wheel 8 and the supporting member 10, but these structures are the same, and one of these structures will be focused on and described below.

The supporting member 10 includes a first supporting portion 52 for supporting the wheel 8, a second supporting portion 54 for supporting the first supporting portion 52, a turning portion 56 rotatable about a rotation axis, that is provided on the bottom portion 6, and a parallel link mechanisms 58 that is put across a second supporting portion 54 and the turning portion 56. Further, the supporting member 10 has a first motor 60 as an example of a first driving section for making the wheel 8 rotate, a second motor 62 as an example of a second driving section for changing the direction of the wheel, a third motor 64 as an example of a third driving section for changing the distance between the wheel 8 and the bottom portion 6, and a fourth motor 66 as an example of a fourth driving section for rotating the turning portion 56.

The wheel 8 is configured to be able to rotate in respect to the supporting member 10. The rotating direction of the wheel is bidirectional.

The first supporting portion 52 supports the wheel 8 rotatably. As shown in FIG. 5, the first motor 60 is contained in the first supporting portion 52, and the first motor 60 rotates the wheel 8 by its driving force. Note that, the first supporting member 52 is also provided with a known driving force transfer section (not shown), such as a gear or a belt, for transferring a driving force of the first motor 60.

The second supporting portion 54 supports the first supporting portion 52 so that the direction of the wheel 8 supported by the first supporting portion 52 can change. That is, the first supporting portion 52 is connected to the second supporting portion 54 via a joint 70, and when the first supporting portion 52 rotatingly moves integrally with the wheel 8 with the joint 70 as the center, the angle between the first supporting portion 52 and the second supporting portion 54 is changed. Then, as shown in the left figure FIG. 6A, by this movement, the direction of the wheel 8 supported by the first supporting portion 52 is changed. Further, as shown in FIG. 5, the second motor 62 is contained in the second supporting portion 54. The second motor 62 rotates the first supporting portion 52 by its driving force, so as to change the direction of the wheel 8. Note that, the second supporting portion 54 is also provided with a known driving force transfer section (not shown), such as a gear or a belt, for transferring the driving force of the second motor 62.

The turning portion 56 is provided to the bottom portion 6, and the turning portion 56 supports the second supporting portion 54 so that the distance between the wheel 8 and the bottom portion 6 can be changed. That is, the turning portion 56 is connected to the second supporting portion 54 via the parallel link mechanism 58 that is put across the second supporting portion 54 and the turning portion 56, and when the parallel link mechanism 58 is operated, as shown in FIG. 6B, the second supporting portion 54 moves up and down integrally with the first supporting portion 52 and the wheel 8. Then, by this movement, the distance between the wheel 8 and the bottom portion 6 is changed (the wheel 8 moves closer to or away from the bottom portion 6). Further, as shown in FIG. 5, the third motor 64 is contained in the turning portion 56, and the third motor 64, by its driving force, makes the parallel link mechanism 58 operate. More specifically, the parallel link mechanism 58 includes a pair of first links 58a and a pair of second links 58b positioned further to the bottom portion 6 side than the first links 58a. The third motor 64, by its driving force, rotates the first links 58a about an axis B. Thus, the first links 58a operate, and with this movement, the second links 58b also operate while maintaining the parallel state in respect to the first links 58a. Note that, the turning portion 56 is also provided with a known driving force transfer section (not shown), such as a gear or a belt, for transferring the driving force of the third motor 64. Further, as described above, the back surface of the bottom portion 6 is provided with the recess portions 6a. The recess portion 6a has a function of preventing the wheel 8 and the supporting member 10 from contacting the bottom portion 6, at the time the distance between the wheel 8 and the bottom portion 6 is changed and the wheel 8 comes close to the bottom portion 6.

Further, the turning portion 56 is configured so that it can rotate about a rotation axis A that has its axial direction along a direction intersecting the bottom portion 6, and the turning portion 56 supports the second supporting portion 54 so that the position of the wheel 8 can be moved in a state that the distance between the wheel 8 and the bottom portion 6 is maintained by the rotation of the turning portion 56. That is, when the turning portion 56 rotates, as shown in FIG. 6C, the wheel 8 that is supported by the turning portion 56 via the first supporting portion 52 and the second supporting portion 54 moves so as to draw an arc. At this time, if the above described third motor 64 is not driven, in a state that the distance between the wheel 8 and the bottom portion 6 is maintained, the position of the wheel 8 is moved. Further, as shown in FIG. 5, a fourth motor 66 is contained in the turning portion 56. The fourth motor 66 rotates the turning portion 56 by its driving force, in order to move the position of the wheel 8. Note that, the turning portion 56 is provided with a known driving force transfer section (not shown), such as a gear or a belt, for transferring the driving force of the fourth motor 66.

Further, the passenger car 2 includes a sub-computer 12 as an example of a controlling section for controlling the first motor 60, the second motor 62, the third motor 64, and the fourth motor 66. Eight sub-computer 12 are provided, one for every wheel, and the eight sub-computers 12 are positioned lower than the front surface of the bottom portion 6. More specifically, as shown in FIG. 7, the eight sub-computers 12 are contained in the convex portion 6b described above provided on the back surface of the bottom portion 6. Each sub-computer 12 includes a CPU, a ROM, a RAM or the like, and the sub-computer 12 controls the first motor 60, the second motor 62, the third motor 64, and the fourth motor 66 that are for realizing the above described movements of the wheel 8 corresponding to the sub-computer 12.

Further, the passenger car 2 includes a main computer 14 as an example of a main controlling section that can communicate with each of the eight sub-computers 12. As shown in FIG. 7, the main computer 14 is provided at an end portion of the bottom portion 6 on the back surface of the bottom portion 6, and in this embodiment the main computer 14 is connected to the eight sub-computers 12 via cables 16 and hubs 18. The main computer 14 includes a CPU, a ROM, and a RAM or the like, and has a function of being in charge of the eight sub-computers 12.

An example of a Movement of the Passenger Car 2

As described above, the passenger car 2 according to this embodiment has eight wheels 8, and each of the wheels can perform the above four types of independent motions (the wheel rotates, the direction of the wheel is changed, the distance between the wheel and the bottom portion is changed, the position of the wheel is moved). Further, the movements of each wheel 8 are combined, and the passenger car 2 performs a variety of movements.

Hereinbelow, an example of the variety of movements is described using FIGS. 8A to 13E.

FIGS. 8A to 8H are state transition diagrams showing a manner where the passenger car 2 performs a forward run and a rotating movement continuously. FIGS. 9A to 9G are state transition diagrams showing a manner where the passenger car 2 performs a forward run and a horizontal movement continuously. FIGS. 10A to 10I are state transition diagrams showing a manner where the passenger car 2 walks. FIGS. 11A to 11I are state transition diagrams showing a manner where the passenger car 2 climbs up a step during the forward run. FIGS. 12A to 12I are state transition diagrams showing a manner where the passenger car 2 runs forward by avoiding contact with a curb. FIGS. 13A to 13E are state transition diagrams showing a manner where the passenger car 2 is moving up an inclination. Note that, in FIGS. 8A to 10I, the wheel that is shaded represents a wheel that is not contacting the ground, and the wheel that is not shaded represents the wheel that is contacting the ground.

Note that, hereinbelow are described as examples of the variety of movements, a movement of performing the forward run and the rotating movement continuously, a movement of performing the forward run and the horizontal movement continuously, a walking movement, a movement in the case where there are projections and depressions on the ground, and a movement in the case where there is an inclination on the ground. But the passenger car 2 can also perform other movements, for example, a move in a diagonal direction or a move in a jigzag move or the like.

<<<A Movement of the Passenger Car 2 Performing a Forward Run and a Rotating Movement Continuously>>>

First, a case that the passenger car 2 performs a forward run and a rotating movement continuously is explained using FIGS. 8A to 8H. Note that, in the following explanation, for the sake of convenience, an operation for rotating the wheel 8 by controlling the first motor 60 is called operation A, an operation to change a direction of the wheel 8 by controlling the second motor 62 is called operation B, an operation to change a distance between the wheel 8 and the bottom portion 6 (to move the wheel 8 up or down) by controlling the third motor 64 is called operation C, and an operation to move the position of the wheel 8 by controlling the fourth motor 66 is called operation D.

In the first state A1, it is assumed that the passenger car 2 is running forward in a direction of the arrow. In this case, all of the wheels are rotating in a state contacting the ground, and the forward run by the eight wheels is being performed.

Next, the running state of the passenger car 2 is switched from the forward run by eight wheels to a forward run by four wheels (from state A1 to A2). This switching is realized by performing the operation C to each of the wheels 8b, 8c, 8f, 8g, so that the wheel 8b, 8c, 8f, and 8g are not contacting the ground. At this time, the rotation of the wheels 8b, 8c, 8f, and 8g are stopped.

Next, the passenger car 2 performs preparation for the next operation (that is, a rotating movement) while performing the forward run by four wheels (state A2 to state A3). That is, each of the wheels 8b, 8c, 8f, and 8g that are not contacting the ground, are arranged so that the wheels 8b, 8c, 8f, and 8g are along a circumference shown in FIG. 8. This preparation is realized by performing operation B and operation D to each of the wheels 8b, 8c, 8f, and 8g.

Next, the passenger car 2 rests by making the rotation of the wheels 8a, 8d, 8e, and 8h that are contacting the ground stop (from state A3 to state A4). Then, in the rest state, the passenger car 2 switches the wheels that contact the ground from the wheels 8a, 8d, 8e, and 8h to the wheels 8b, 8c, 8f, and 8g (from state A4 to state A5 to state A6). This switch is realized by performing operation C in respect to each of the eight wheels.

Then, operation A is performed in respect to each of the wheels 8b, 8c, 8f, and 8g that newly contact the ground, and the passenger car 2 rotatingly moves in a state with each of the wheels 8b, 8c, 8f, and 8g along a circumference as shown in FIG. 8, (state A6 to state A7 to state A8).

Note that, as described above, the rotating motion movement is performed in a state that the four wheels 8b, 8c, 8f, and 8g are along the circumference, but the rotating motion movement can be performed in a state that only three wheels are along the circumference.

<<<Movement of the Passenger Car 2 Performing Forward Run and a Horizontal Movement Continuously>>>

Next, using FIG. 9, there is described a case that the passenger car 2 performs a forward run and a horizontal movement continuously. Note that, here, an operation of rotating the wheel 8 by controlling the first motor 60 is referred to as an operation A, an operation of changing a direction of the wheel 8 by controlling the second motor 62 is referred to as an operation B, an operation of changing a distance between the wheel 8 and the bottom portion 6 by controlling the third motor 64 (making the wheel 8 move up and down) is referred to as an operation C, and an operation of moving a position of the wheel 8 by controlling the fourth motor 66 is referred to as an operation D.

In the first state B1, it is assumed that the passenger car 2 is running forward in a direction of the arrow. In this case, all the wheels are rotating in a state that they are contacting the ground, and the forward run by eight wheels is being performed.

Next, the running state of the passenger car 2 is changed from the forward run by eight wheels to the forward run by four wheels (state B1 to state B2). This change is realized by performing operation C to each of the wheels 8*b*, 8*c*, 8*f*, and 8*g* so that the wheels 8*b*, 8*c*, 8*f*, and 8*g* are not contacting the ground. In this case, the rotations of the wheels 8*b*, 8*c*, 8*f*, and 8*g* are stopped.

Next, the passenger car 2 performs preparations for the next operation (that is, a horizontal movement), while performing the forward run by four wheels (state B2 to state B3). That is, the wheels 8*b*, 8*c*, 8*f*, and 8*g* are arranged so that the direction of each of the wheels 8*b*, 8*c*, 8*f*, and 8*g* that are not contacting the ground are caused to be in a direction orthogonal to the traveling direction (a direction shown by an arrow in state B3 of FIG. 9). This preparation is realized by performing the operation B in respect to each of the wheels 8*b*, 8*c*, 8*f*, and 8*g*.

Next, the passenger car 2 rests by making the rotation of the wheels 8*a*, 8*d*, 8*e*, and 8*h* that are contacting the ground stop (state B3 to state B4). Then, in the rest state, the passenger car 2 switches the wheels contacting the ground from the wheels 8*a*, 8*d*, 8*e*, and 8*h* to the wheels 8*b*, 8*c*, 8*f*, and 8*g* (state B4 to state B5 to state B6). The switching is realized by performing the operation C in respect to each of the eight wheels.

Figure 9A:
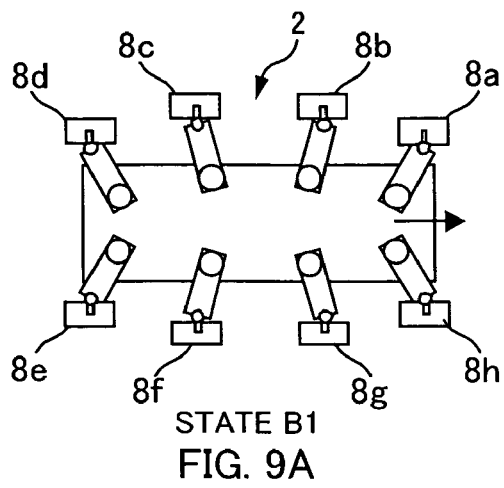
FIGS. 9A to 9G are state transition diagrams showing a manner in which the passenger car 2 performs a forward run and a horizontal movement continuously.
Figure 9B:
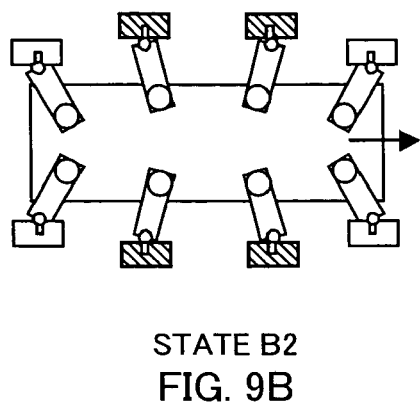
Figure 9C:
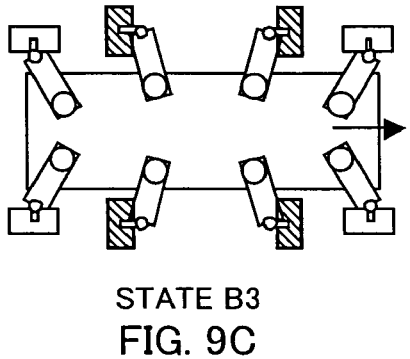
Figure 9D:
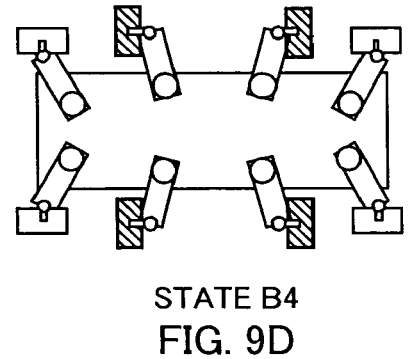
Figure 9E:
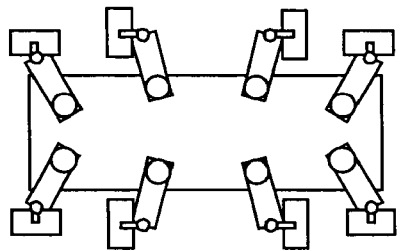
Figure 9F:
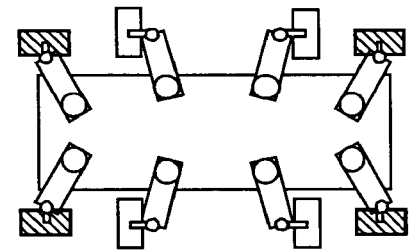
Figure 9G:
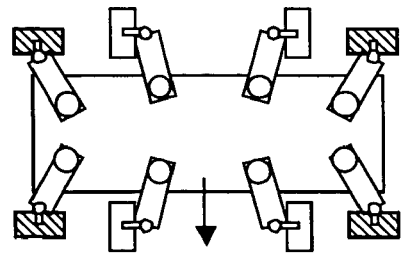
Figure 10A:
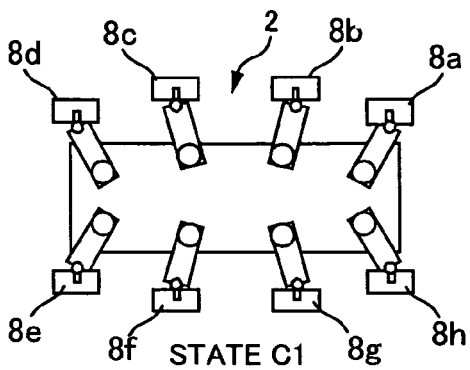
FIGS. 10A to 10I are state transition diagrams showing a manner in which the passenger car 2 walks.
Figure 10B:
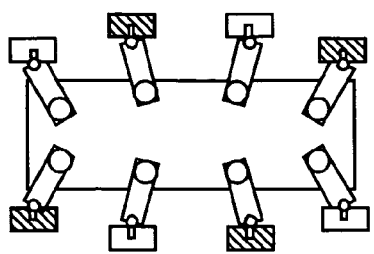
Figure 10C:
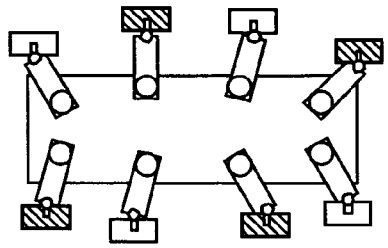
Figure 10D:
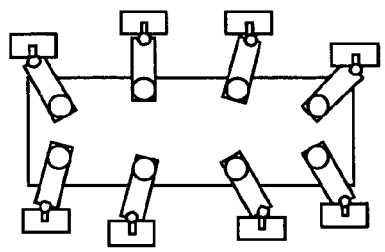
Figure 10E:
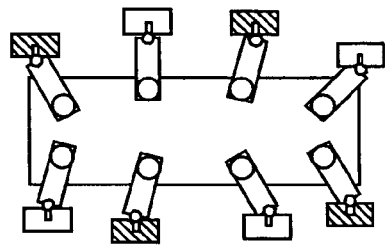
Figure 10F:
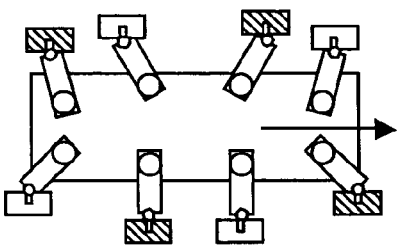
Figure 10G:
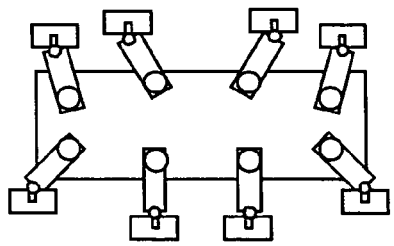
Figure 10H:
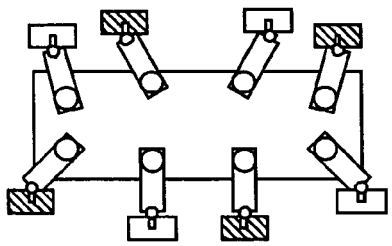
Figure 10I:
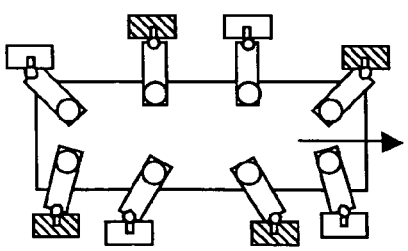

Then, the operation A is performed in respect to each of the wheels 8*b*, 8*c*, 8*f*, and 8*g* that newly contact the ground, and the passenger car 2 moves horizontally in a direction shown by the arrow in state B7 in FIG. 9G (state B6 to state B7).

<<<Walking Movement of the Passenger Car 2>>>

Next, a case in which the passenger car 2 walks is described using FIGS. 10A to 10I. Here, "walking" of the passenger car 2 refers to moving of the passenger car 2 in a state that the rotation of the wheels that are contacting the ground are stopped. More specifically, some of the wheels 8 of the eight wheels 8 provided to the passenger car 2 are made to contact the ground, and in a state that the rotation of the wheels 8 contacting the ground are stopped, the passenger car 2 moves by driving the second motor 62 and the fourth motor 66 that correspond to the wheels 8, so that the bottom portion 6 is made to relatively move in respect to the ground. Note that, here, an operation of changing the direction of the wheel 8 by controlling the second motor 62 is called an operation B, an operation of changing the distance between the wheel 8 and the bottom portion 6 (moving the wheel 8 up and down) by controlling the third motor 64 is called an operation C, and an operation of moving the position of the wheel 8 by controlling the fourth motor 66 is called an operation D.

In the first state C1, it is assumed that the passenger car 2 is at rest. In this situation, the rotation of all the wheels, that are in a state contacting the ground, are stopped.

Next, the wheels 8*a*, 8*c*, 8*e*, and 8*g* of the passenger car 2 are made to be in a state not contacting the ground (state C1 to state C2). The change of this situation is realized by performing the operation C in respect to each of the wheels 8*a*, 8*c*, 8*e*, and 8*g*.

Next, the passenger car 2 performs preparations for the walking movement (state C2 to state C3). That is, the passenger car 2 moves each of the wheels 8*a*, 8*c*, 8*e*, and 8*g* that are not contacting the ground to the front side (right side in state C3 of FIG. 10) of the passenger car 2. This movement is realized by performing the operation D in respect to each of the wheels 8*a*, B*c*, 8*e*, and 8*g*. Further, the passenger car 2 changes the direction of the wheels 8*a*, 8*c*, 8*e*, and 8*g* so that the directions of each of the wheels 8*a*, 8*c*, 8*e*, and 8*g* are along a direction that the passenger car 2 walks (a direction from left to right in state C3 in FIG. 10C). This change is realized by performing operation B in respect to each of the wheels 8*a*, 8*c*, 8*e*, and 8*g*.

Next, the passenger car 2 switches the wheels contacting the ground from the wheels 8*b*, 8*d*, 8*f*, and 8*h* to the wheels 8*a*, 8*c*, 8*e*, and 8*g* (state C3 to state C4 to state C5). This switching is realized by performing operation C in respect to each of the eight wheels.

Then, the passenger car 2 performs the operation B and the operation D in respect to the wheels 8*a*, 8*c*, 8*e*, and 8*g* in a state that the rotation of the wheels 8*a*, 8*c*, 8*e*, and 8*g* that are newly contacting the ground are stopped. Thus, the bottom portion 6 of the passenger car 2 relatively moves in respect to the ground, and the walking movement of the passenger car 2 in the direction of the arrow is realized (state C5 to state C6). Then, the passenger car 2 performs preparation for the next walking movement, in parallel with the walking movement (state C5 to state C6). That is, the passenger car 2 moves each of the wheels 8*b*, 8*d*, 8*f*, and 8*h* that are not contacting the ground to the front side of the passenger car 2 (right side in state C6 of FIG. 10F). This movement is realized by performing the operation D in respect to each of the wheels 8*b*, 8*d*, 8*f*, and 8*h*. Further, the passenger car 2 changes the direction of the wheels 8*b*, 8*d*, 8*f*, and 8*h* so that the direction of each of the wheels 8*b*, 8*d*, 8*f*, and 8*h* are along the direction in which the passenger car 2 walks (a direction from the left to the right in state C6 in FIG. 10F). This change is realized by performing the operation B to each of the wheels 8*b*, 8*d*, 8*f*, and 8*h*.

Next, the passenger car 2 switches the wheels contacting the ground, from the wheels 8*a*, 8*c*, 8*e*, and 8*g* to the wheels 8*b*, 8*d*, 8*f*, and 8*h* (state C6 to state C7 to state C8). This switching is realized by performing the operation C in respect to each of the eight wheels.

Then, the passenger car 2 performs the operation B and the operation D in respect to the wheels 8*b*, 8*d*, 8*f*, and 8*h* in a state that the rotation of the wheels 8*b*, 8*d*, 8*f*, and 8*h* that are newly contacting the ground are stopped. Thus, the bottom portion 6 of the passenger car 2 relatively moves in respect to the ground, and the walking movement of the passenger car 2 in the arrow direction is realized (state C8 to state C9).

Hereinbelow, by repeating the above described movements, the walking of the passenger car 2 is continued.

<<<Movement of the Passenger Car 2 in the Case Where There are Projections and Depressions on the Ground>>>

Next, a movement of the passenger car 2 in the case where there are projections and depressions on the ground is described. The passenger car 2 according to this embodiment can move in a state that the bottom portion 6 is maintained horizontal even in the case there are projections and depressions on the ground by making eight wheels 8 provided to the passenger car 2 to selectively contact the ground. Hereinbelow, as examples of movements of the passenger car 2 in the case there are projections and depressions on the ground, there are described a movement of the passenger car 2 in the case where there is a step on the ground, and a movement of the passenger car 2 in the case there is a curb on the ground.

First, the movement of the passenger car 2 in the case where there is a step on the ground is described using FIG. 11. Note that, the passenger car 2 according to this embodiment has information regarding a position or a height of the step in advance.

In the first state D1, it is assumed that the passenger car 2 is running forward in the direction of the arrow. In this case, all the wheels are rotating in a state contacting the ground, and the forward running by eight wheels is performed.

Next, when the distance between the step and the wheels 8*a* and 8*h* becomes within a predetermined distance, the passenger car 2 moves the wheels 8*a* and 8*h* upwards for the amount of the height of the step (state D1 to state D2). That is, the running state of the passenger car 2 is switched from the forward running by eight wheels to forward running by six wheels.

Then, at the time the wheels 8*a* and 8*h* reach the step, the wheels 8*a* and 8*h* climb on the step (state D2 to state D3). Here, the running state of the passenger car 2 returns to the forward running by eight wheels from the forward running by six wheels.

Next, when the distance between the step and the wheels 8*b* and 8*g* becomes within a predetermined distance, the passenger car 2 moves the wheels 8*b* and 8*g* upwards for the amount of the height of the step (state D3 to state D4). That is, the running state of the passenger car 2 changes again to the forward running by six wheels from the forward running by eight wheels.

Then, at the time the wheels 8*b* and 8*g* reach the step, the wheels 8*b* and 8*g* climb on the step (state D4 to state D5). Here, the running state of the passenger car 2 again returns to the forward running by eight wheels from the forward running by six wheels.

Hereinbelow, similar movements are performed in regards to the wheels 8*c* and 8*f* and the wheels 8*d* and 8*e* (state D5 to state D6 to state D7 to state D8 to state D9). In the end, the passenger car 2 is to run forward on the step in a state that all the wheels are contacting the ground (state D9).

Thus, the passenger car 2 can climb up the step in a state that the bottom portion 6 is maintained horizontal at all times (from state D1 to state D9) by making eight wheels 8 to selectively contact the ground.

Note that, in the above, the movement of the passenger car 2 climbing up the step is described, but if the movement is continued, the passenger car 2 can also climb up stairs. Further, the passenger car 2 can perform a movement of climbing down a step, and by continuing the movement can also climb down stairs.

Next, the movement of the passenger car 2 in the case where there is a curb on the ground is described using FIG. 12. Note that, the passenger car 2 according to this embodiment is assumed to have information according to a position or a height of the curb in advance.

In the first state E1, it is assumed that the passenger car 2 is running forward in a direction of the arrow. In this case, all the wheels are rotating in a state contacting the ground, and the forward running by eight wheels is performed.

Next, when a distance between the curb and the wheels 8*a* and 8*h* becomes within a predetermined distance, the passenger car 2 moves the wheels 8*a* and 8*h* upwards (state E1 to state E2). That is, the running state of the passenger car 2 changes to the forward running by six wheels from the forward running by eight wheels. Note that, how much the wheels 8*a* and 8*h* are moved upwards, depends on the height of the curb. In other words, the wheels 8*a* and 8*h* are to be moved upwards to a degree that the wheels 8*a* and 8*h* do not contact the curb at the time the wheels 8*a* and 8*h* reach the curb. Then, at the time the wheels 8*a* and 8*h* reach the curb, it is possible for the wheels 8*a* and 8*h* to avoid contact with the curb.

Next, when the wheels 8*a* and 8*h* pass over the curb, the passenger car 2 moves the wheels 8*a* and 8*h* downwards and makes them contact the ground (state E2 to state E3). Here, the running state of the passenger car 2 returns to the forward run by eight wheels from the forward run by six wheels.

Next, when the distance between the curb and the wheels 8*b* and 8*g* becomes within a predetermined distance, the passenger car 2 moves the wheels 8*b* and 8*g* upwards (state E3 to state E4). That is, the running state of the passenger car 2 again changes from the forward running by eight wheels to the forward running by six wheels. Then, at the time the wheels 8*b* and 8*g* reach the curb, contact of the wheels 8*a* and 8*h* with the curb is avoided.

Next, when the wheels 8*b* and 8*g* pass over the curb, the passenger car 2 moves the wheels 8*b* and 8*g* downwards and makes them contact the ground (state E4 to state E5). Here, the running state of the passenger car 2 is again returned to the forward running by eight wheels from the forward running by six wheels.

Hereinbelow, similar movements are performed in regards to the wheels 8*c* and 8*f* and the wheels 8*d* and 8*e* (state E5 to state E6 to state E7 to state E8 to state E9), and finally, the passenger car 2 passes the curb so that all the wheels do not contact the curb (state E9).

Thus, by making eight wheels 8 to selectively contact the ground, the passenger car 2 can run forward while avoiding contact to the curb in a state that the bottom portion 6 is maintained horizontal at all times (from state E1 to state E9).

Note that, the movement of the passenger car 2 in the case there is a projection (curb) on the ground is described above. But, by making eight wheels 8 to selectively contact the ground, the passenger car 2 can run forward while avoiding contact with a depression, in a state that the bottom portion 6 is maintained horizontal even in the case there is a depression such as a dip or a hole in the ground.

Further, an example of the passenger car 2 traveling in a straight line is described above, but the passenger car 2 can make a turn or move rotatingly in a state that the bottom portion 6 is maintained horizontal even in the case where there is a step or a curb in the ground.

Further, the passenger car 2, described above, is assumed to have information regarding the position or the height of the projections and depressions such as the step or the curb in advance, and that eight wheels 8 are made to selectively contact the ground based on the information, but this is not a limitation. For example, the eight wheels may be made to selectively contact the ground in accordance with an output of a detecting means for detecting the projections and depressions.

<<<Movement of the Passenger Car 2 in the Case There is an Inclination in the Ground>>>

A movement of the passenger car 2 in the case where there is an inclination in the ground is described next. The passenger car 2 according to this embodiment can move in a state that the bottom portion 6 is maintained horizontal even in the case there is an inclination in the ground by changing the distance between the wheel 8 and the bottom portion 6 according to the inclination of the ground. Hereinbelow, the movement of the passenger car 2 in the case where there is an inclination in the ground is described using FIG. 13. Note that, the passenger car 2 according to this embodiment is assumed to have information regarding the position or the height of the inclination in advance. Further, in this embodiment, the inclination angle of the inclination of the ground is assumed to always be constant.

In a first state F1, it is assumed that the passenger car 2 is running forward in a direction of the arrow. In this case, all the wheels are rotating in a state contacting the ground, and the forward run by eight wheels is performed.

Next, when the wheels 8a and 8h approach the inclination, the passenger car 2 moves the wheels 8a and 8h upwards (state F1 to state F2). Note that, how much the wheels 8a and 8h are moved upwards depends on the degree of the inclination. More specifically, the wheels 8a and 8h are moved so that a difference between a distance between the wheels 8a, 8h and the bottom portion 6 and a distance between the wheels 8d, 8e and the bottom portion 6 is made to be always the same as a difference between a height of a ground that the wheels 8a and 8h are contacting and a height of a ground that the wheels 8d and 8e are contacting.

Next, when the wheels 8b and 8g approach the inclination, the passenger car 2 moves the wheels 8b and 8g upwards (state F2 to state F3). Here also, how much the wheels 8b and 8g are moved upwards depends on the degree of the inclination. The passenger car 2 moves the wheels 8b and 8g so that a difference between a distance between the wheels 8b, 8g and the bottom portion 6 and a distance between the wheels 8d, 8e and the bottom portion 6 is made to be always the same as a difference between a height of a ground that the wheels 8b and 8g are contacting and a height of a ground that the wheels 8d and 8e are contacting. Further, during the time between state F2 to state F3, the passenger car 2 moves the wheels 8a and 8h so that a difference between a distance between the wheels 8a, 8h and a bottom portion 6 and a distance between the wheels 8d, 8e and the bottom portion 6 is made to be always the same as a difference between a height of a ground that the wheels 8a, 8h are contacting and a height of a ground that the wheels 8d, 8e are contacting.

Next, when the wheel 8c and 8f approach the inclination, the passenger car 2 moves the wheels 8c and 8f upwards (state F3 to state F4). Here, how much the wheels 8c and 8f are moved upwards depends on the degree of the inclination, and the passenger car 2 moves the wheels 8c and 8f so that a difference between a distance between the wheels 8c, 8f and the bottom portion 6 and a distance between the wheels 8d, 8e and the bottom portion 6 is made to be always the same as a difference between a height of a ground that the wheels 8c, 8f are contacting and a height of a ground that the wheels 8d, 8e are contacting.

Further, in between state F3 and state F4, the passenger car 2 moves the wheels 8a and 8h so that a difference between a distance between the wheels 8a, 8h and the bottom portion 6 and a distance between the wheels 8d, 8e and the bottom portion 6 is made to be always the same as a difference between a height of a ground that the wheels 8a, 8h are contacting and a height of a ground that the wheels 8d, 8e are contacting. Similarly, the wheels 8b and 8g are moved so that a difference between a distance between the wheels 8b, 8g and the bottom portion 6 and a distance between the wheels 8d and 8e and the bottom portion 6 is made to be always the same as a difference between a height of a ground that the wheel 8b and 8g are contacting and a height of a ground that the wheels 8d and 8e are contacting.

Then, when the wheels 8d and 8e approach the inclination, the above described upward movement of the wheels 8a, 8b, 8c, 8f, 8g, and 8h is stopped. Finally, the passenger car 2 runs forward on the inclination (state F4 to state F5).

Thus, the passenger car 2 can move in a state that the bottom portion 6 is maintained horizontal at all times (from state F1 to state F5) even in the case where there is an inclination in the ground, by making the distance between the wheel 8 and the bottom portion 6 change in accordance with the inclination of the ground.

Note that, the movement of the passenger car 2 going up the inclination is described above, but if the wheels 8 are to be moved downwards according to the inclination of the ground, the passenger car 2 can also go down the inclination.

Further, an example of the passenger car 2 traveling in a straight line is described above, but the passenger car 2 can make a turn or move rotatingly in a state that the bottom portion 6 is maintained horizontal even in the case where the ground has an inclination.

Further, in the above that the passenger car 2 has information regarding the position or the height of the inclination in advance, and the distance of the wheels 8 from the bottom portion 6 is to be changed based on the information, but this is not a limitation. For example, the distance of the wheels from the bottom portion can be changed according to an output of a detecting section for detecting the inclination.

As described in the paragraph of the Related Art, a typical conventional car has four wheels, and some or all of the four wheels are driven, so that the car travels in a predetermined traveling direction. This car can make a turn by changing the direction of the wheels or can reverse by rotating the wheels in an opposite direction, but the variety of the movements is limited.

On the other hand, the car according to this embodiment is provided with at least 8 pairs of the wheel 8 and the supporting member 10, and further, the supporting member 10 has a first supporting portion 52 for supporting the wheel 8 rotatably, a second supporting portion 54 for supporting the first supporting portion 52 so that the direction of the wheel 8 supported by the first supporting portion 52 can be changed, and a turning portion 56 that is provided to the bottom portion 6 and that can rotate about a rotation axis with its axial direction along a direction orthogonal to the bottom portion 6. The turning portion 56 supports the second supporting portion 54 so that the distance between the wheel 8 and the bottom portion 6 can be changed, and that the position of the wheel 8 can be moved in a state that the distance is maintained by the rotation of the turning portion 56. Thus, the above described variety of movements can be realized.

Other Embodiments

As described above, a car according to the present invention based on the above embodiment is described, but the above embodiment of this invention is to facilitate the understanding of this invention, and is not to limit this invention. This invention can be changed or altered within the scope of this invention, and it is needless to say that this invention includes its equivalents.

Note that, the above embodiment describes a passenger car 2 that a person can ride in, as an example of a car, but as long as it is a car it can be applied to any kind of car. For example, the car can be a toy car or a truck for conveying things.

In the case the car according to this invention is a passenger car, a toy car, or a truck, there are the below merits. That is, if the car according to this invention is a passenger car, the passenger car can perform a variety of movements, thus a passenger car that is very convenient can be realized. Further, if the car according to this invention is a toy car, since the toy car can perform a variety of movements, there can be realized a toy car that is attractive to a buyer. Further, if the car according to this invention is a truck, since the truck can perform a variety of movements, a truck that can convey in diverse ways can be realized.

Further, in the above embodiment, the turning portion 56 is to support the second supporting portion 54 via a parallel link mechanism 58, but this is not a limitation. For example, the turning portion can support the second supporting portion via a mechanism other than the parallel link mechanism.

But, this embodiment is more preferable in that support of the second supporting portion 54 by the turning portion 56 is realized by a simple structure.

Further, in the above embodiment, the first motor 60, the second motor 62, the third motor 64, and the fourth motor 66 are to be provided for each wheel 8, but this is not a limitation. For example, any of the above motors may be configured so as to drive a plurality of the wheels.

In the case where there are provided the first motor 60, the second motor 62, the third motor 64, and the fourth motor 66 for every wheel 8, one wheel 8, a corresponding supporting member 10, and the corresponding motor can be made into one module. Therefore, by attaching the module to the car body 4, and detaching the module from the car body 4, the number of the wheels 8 can be easily increased or decreased. Regarding this point, the above embodiment is more preferable.

Further, in the above embodiment, the first motor 60, the second motor 62, the third motor 64, and the fourth motor 66, are provided in the supporting member 10, and the supporting member 10 and the wheel 8 are positioned lower than the front surface of the bottom portion 6, but this is not a limitation. For example, the supporting member and the wheel can be positioned above the front surface of the bottom portion.

In the case the first motor 60, the second motor 62, the third motor 64, and the fourth motor 66, are provided in the supporting member 10, and the supporting member 10 and the wheel 8 are positioned lower than the front surface of the bottom portion 6, then the front surface of the bottom portion 6 can easily be made even (flat). Then, in the case where the front surface of the bottom portion 6 is even, it is possible to flexibly design an internal structure of the car body 4 (especially in the periphery of the front surface of the bottom portion 6). In this regard, the above embodiment is more preferable.

Further, in the above embodiment, a sub-computer 12 for controlling the first motor 60, the second motor 62, the third motor 64, and the fourth motor 66, is to be provided for every wheel 8, but this is not a limitation. For example, the sub-computer can be configured to control a plurality of the wheels.

In the case the sub-computer 12 is provided for every wheel, one wheel 8, the corresponding supporting member 10, the corresponding above motor, and the corresponding sub-computer 12 can be made into one module. Therefore, by attaching the module to the car body 4, or by detaching the module from the car body 4, it is possible to increase or decrease the number of wheels 8 more easily. In this regard, the above embodiment is more preferable.

Further, in the above embodiment, the sub-computer 12 is positioned lower than the front surface of the bottom portion 6, but this is not a limitation. For example, the sub-computer can be positioned above the front surface of the bottom portion.

In the case the sub-computer 12 is positioned lower than the front surface of the bottom portion 6, the front surface of the bottom portion 6 can be made even (flat) more easily. Then, in the case the front surface of the bottom portion 6 is even, it is possible to flexibly design an internal structure (especially, in the periphery of the front surface of the bottom portion 6) of the car body 4. In this regard, the above embodiment is more preferable.

Further, in the above embodiment, the back surface of the bottom portion 6 is provided with the convex portion 6b for containing the sub-computer 12, but this is not a limitation. For example, the convex portion does not have to be formed on the back surface of the bottom portion.

But, even in the case where the size of the sub-computer 12 is large, in regard that the front surface of the bottom portion 6 can be made even (flat) easily, the above embodiment is more preferable.

Further, in the above embodiment, the back surface of the bottom portion 6 is to be provided with the recess 6a for preventing the wheel 8 and the supporting member 10 from contacting the bottom portion 6, at the time the distance between the wheel 8 and the bottom portion 6 is changed and the wheel 8 comes near to the bottom portion 6, however, this is not a limitation. For example, the recess portion does not have to be provided in the back surface of the bottom portion.

In the case where the recess 6a having the above function is provided on the back surface of the bottom portion 6, the car can be moved in a state that the front surface of the bottom portion 6 and the wheel 8 are close to each other. In other words, the car can move in a state that the vehicle's height is made low. Further, in the case where there is a projection such as a step or a curb on the ground, even if the height of the projection is high, it is possible to realize a desired movement (for example, a movement of climbing up a step or a movement of climbing over a curb). Further, in the case there is an inclination in the ground, even in the case where the inclination angle of the inclination is large, it is possible to realize a movement of moving in a state that the bottom portion is maintained horizontal. From this regard, this embodiment is more preferable.

Further, in this embodiment, it is assumed that there are provided a main computer 14 that can communicate with each of the sub-computers 12, but this is not a limitation. For example, there does not have to be provided the main computer.

What is claimed is:

1. A car comprising:
   a car body having a bottom portion;
   a wheel that is rotatable; and
   a supporting member for supporting the wheel, the supporting member being provided to the bottom portion,
   wherein at least eight pairs of the wheel and the supporting member are provided,
   wherein the supporting member has
     a first supporting portion for supporting the wheel rotatably,
     a second supporting portion for supporting the first supporting portion so that a direction of the wheel supported by the first supporting portion can be changed, and
     a turning portion that is rotatable about a rotation axis with its axial direction along a direction orthogonal to the bottom portion, the turning portion being provided to the bottom portion,
   wherein the turning portion supports the second supporting portion so that a distance between the wheel and the bottom portion can be changed, and a position of the wheel can be moved by a rotation of the turning portion in a state that the distance is maintained, and
   wherein the car is a passenger car that a person can ride in.

2. A car according to claim 1, wherein the turning portion supports the second supporting portion via a parallel link mechanism.

3. A car according to claim 1, comprising:
   a first driving section for rotating the wheel;

a second driving section for changing a direction of the wheel;

a third driving section for changing a distance between the wheel and the bottom portion; and a fourth driving section for rotating the turning portion, wherein the first driving section, the second driving section, the third driving section, and the fourth driving section are provided for every wheel.

4. A car according to claim 3, wherein the first driving section, the second driving section, the third driving section, and the fourth driving section are provided in the supporting member, and wherein the supporting member and the wheel are positioned lower than a front surface of the bottom portion.

5. A car according to claim 3, comprising a controlling section for controlling the first driving section, the second driving section, the third driving section, and the fourth driving section, wherein the controlling section is provided for every wheel.

6. A car according to claim 5, wherein the controlling section is positioned lower than the front surface of the boffom portion.

7. A car according to claim 6, wherein a convex portion for containing the controlling section is provided on a back surface of the bottom portion.

8. A car according to claim 7, wherein a recess portion is provided in the back surface of the bottom portion, the recess portion being for preventing the wheel and the supporting portion from contacting the bottom portion at the time a distance between the wheel and the bottom portion is changed and the wheel comes close to the bottom portion.

9. A car according to claim 5, comprising a main controlling section that can communicate with each controlling section.

10. A car according to claim 3, wherein some of the wheels of the at least eight wheels provided to the car, that are in a state not contacting a ground, move.

11. A car according to claim 3, wherein the car moves in a state that the bottom portion is maintained horizontal even in the case where there are projections and depressions in the ground, by selectively contacting to the ground the at least eight wheels provided to the car.

12. A car according to claim 11, comprising a detecting section for detecting the projections and the depressions, wherein the at least eight wheels are selectively made to contact the ground, according to an output of the detecting section.

13. A car according to claim 3, wherein the car moves in a state that the bottom portion is maintained horizontal even in the case where there is an inclination in the ground, by changing the distance between the wheel and the bottom portion according to the inclination of the ground.

14. A car according to claim 13, comprising a detecting section for detecting the inclination, wherein the distance between the wheel and the bottom portion is changed according to an output of the detecting section.

15. A car according to claim 3, wherein the car moves by making some of the wheels of the at least eight wheels provided to the car contact the ground, and making the bottom portion move relatively in respect to the ground, by driving the second driving section and the fourth driving section, that correspond to the wheel, in a state that a rotation of the wheel contacting the ground is stopped.

16. A car comprising:

a car body having a bottom portion;

a wheel that is rotatable; and a supporting member for supporting the wheel, the supporting member being provided to the bottom portion, wherein at least eight pairs of the wheel and the supporting member are provided, wherein the supporting member has a first supporting portion for supporting the wheel rotatably, a second supporting portion for supporting the first supporting portion so that a direction of the wheel supported by the first supporting portion can be changed, and a turning portion that is rotatable about a rotation axis with its axial direction along a direction orthogonal to the bottom portion, the turning portion being provided to the bottom portion, and wherein the turning portion supports the second supporting portion so that a distance between the wheel and the bottom portion can be changed, and a position of the wheel can be moved by a rotation of the turning portion in a state that the distance is maintained;

the turning portion supports the second supporting portion via a parallel link mechanism, comprising:

a first driving section for rotating the wheel;

a second driving section for changing a direction of the wheel;

a third driving section for changing a distance between the wheel and the bottom portion; and a fourth driving section for rotating the turning portion, wherein the first driving section, the second driving section, the third driving section, and the fourth driving section are provided for every wheel;

the first driving section, the second driving section, the third driving section, and the fourth driving section are provided in the supporting member, wherein the supporting member and the wheel are positioned lower than a front surface of the bottom portion;

comprising a controlling section for controlling the first driving section, the second driving section, the third driving section, and the fourth driving section, wherein the controlling section is provided for every wheel;

wherein the controlling section is positioned lower than the front surface of the bottom portion;

a convex portion for containing the controlling section is provided on a back surface of the bottom portion;

wherein a recess portion is provided in the back surface of the bottom portion, the recess portion being for preventing the wheel and the supporting portion from contacting the bottom portion at the time a distance between the wheel and the bottom portion is changed and the wheel comes close to the bottom portion;

comprising a main controlling section that can communicate with each controlling section;

some of the wheels of the at least eight wheels provided to the car, that are in a state not contacting a ground, move; and the car is a passenger car that a person can ride in.

* * * * *